(12) United States Patent
Hudis et al.

(10) Patent No.: US 7,383,552 B2
(45) Date of Patent: *Jun. 3, 2008

(54) OBJECT MANAGER FOR COMMON INFORMATION MODEL

(75) Inventors: Irena Hudis, Bellevue, WA (US); Raymond W. McCollum, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 598 days.

This patent is subject to a terminal disclaimer.

(21) Appl. No.: 11/004,431

(22) Filed: Dec. 3, 2004

(65) Prior Publication Data

US 2005/0108725 A1 May 19, 2005

Related U.S. Application Data

(63) Continuation of application No. 10/076,166, filed on Feb. 13, 2002, now Pat. No. 6,862,736.

(51) Int. Cl.
*G06F 9/46* (2006.01)
(52) U.S. Cl. ..................... 719/316; 709/223
(58) Field of Classification Search ................ 719/316, 719/310–332; 709/223, 200–253
See application file for complete search history.

(56) References Cited

U.S. PATENT DOCUMENTS

| | | | |
|---|---|---|---|
| 4,800,488 A | 1/1989 | Agrawal et al. | |
| 4,974,149 A | 11/1990 | Valenti | |
| 5,511,191 A | 4/1996 | De Leeuw van Weenen et al. | |
| 5,555,375 A | 9/1996 | Sudama et al. | |
| 5,710,925 A | 1/1998 | Leach et al. | |
| 5,742,762 A | * 4/1998 | Scholl et al. ............... | 709/200 |
| 5,751,962 A | 5/1998 | Fanshier et al. | |
| 5,752,242 A | 5/1998 | Havens | |
| 5,764,955 A | 6/1998 | Doolan | |
| 5,806,065 A | 9/1998 | Lomet | |
| 5,809,478 A | 9/1998 | Greco et al. | |
| 5,832,268 A | 11/1998 | Anderson et al. | |
| 5,838,970 A | 11/1998 | Thomas | |
| 5,864,843 A | 1/1999 | Carino, Jr. et al. | |
| 5,875,327 A | 2/1999 | Brandt et al. | |

(Continued)

OTHER PUBLICATIONS

Agoulmine, Nazim et al. "A System Architecture for Updating Management Information in Heterogenous Networks." IEEE. 1992.*

(Continued)

*Primary Examiner*—Lewis A. Bullock, Jr.
(74) *Attorney, Agent, or Firm*—Workman Nydegger

(57) ABSTRACT

A common information model (CIM) enables management application programs to receive uniformly rendered results regardless of the source of the information. A CIM object manager isolates the applications from internal components which retrieve the information from various sources and through various other components, and provides refinements to that model that improve the exchange of information. In addition to providing uniform rendering of management information to a client applications, the CIM object manager dynamically adapts to complement the capabilities of the information providers, whereby the information providers may do so in a highly flexible manner. The CIMOM also decomposes a client query to determine the appropriate source or sources of information necessary to resolve that query, and further handles client queries having inherited object classes to render appropriate results in a uniform manner.

29 Claims, 8 Drawing Sheets

U.S. PATENT DOCUMENTS

| | | | | |
|---|---|---|---|---|
| 5,892,916 | A | | 4/1999 | Gehlhaar et al. ...... 395/200.53 |
| 5,892,946 | A | | 4/1999 | Woster et al. |
| 5,893,107 | A | | 4/1999 | Chan et al. ................. 707/103 |
| 5,991,806 | A | | 11/1999 | McHann, Jr. |
| 6,078,914 | A | | 6/2000 | Redfern |
| 6,105,061 | A | * | 8/2000 | Nakai ......................... 709/223 |
| 6,145,001 | A | | 11/2000 | Scholl et al. ............... 707/100 |

OTHER PUBLICATIONS

Bierman, A. and Iddon, R., "Remote Network Monitoring MIB Protocol Identifiers," Network Working Group (Jan. 1997), ftp://ftp.isi.edu/in-notes/rfc2074.txt, Jun. 23, 1999.

Case, J. et al., "RFC 1907: Management Information Base for Version 2 of the Simple Network Management Protocol (SNMPv2)," Mailing List: RFCs (Request for Comments), ListQuest.com (Dec. 31, 1995) http://www.listquest.com/computers/index.html, Jun. 22, 1999.

Case, J. et al., "A Simple Network Mangement Protocol (SNMP)," Network Working Group (May 1990), http://www.ietf.org/rfc/refl157.txt, Jun. 22, 1999.

*OLE Management Services Design Preview: properties, associations, and model data* chart, Microsoft Corporation (Feb. 20 & 21, 1996).

Stallings, William, *SNMP SNMPv2 and RMON: Practical Network Management*, 2nd ed., Addison-Wesley (1996).

Waldbusser, S., "Remote Network Monitoring Management Information Base," Network Working Group (Feb. 1995), ftp://ftp.isi.edu/in-notes/rfc1757.txt, Jun. 23, 1999.

Waldbusser, S., "Remote Network Monitoring Management Information Base Version 2 Using SMIv2," Network Working Group (Jan. 1997), ftp://ftp.isi.edu/in-notes/rfc2021.txt, Jun. 23, 1999.

*OLE Management Services Design Preview*: block diagram, Microsoft Corporation (Feb. 20 & 21, 1996).

Object Management Group. "IBM/JOSS Object Services Persistence Service Specification".

CISCO Systems, Inc. "Management Information Base for Version 2 of the SNMP" Network Working Group RFC1904. Jan. 1996.

Keller, Alexander. Service-based Systems Management Using CORBA as a Middleware for Intelligent Agents: IEEE. pp. 1-12, Oct. 1996.

Warrier, U. et al. "The Common Management Information Services and Protocol" pp. 1-35, Apr. 1989.

Martin, David et al. "Information Brokering in an Agent Architecture." In Proceedings of the Second International Conference on the Practical Application of Intelligent Agents and Multi-Agent Technology. London, Apr. 1997.

Martin, David et al. "Development Tools for the Open Agent Architecture." The Practical Application of Intelligent Agents and Multi-Agent Technology. London, Apr. 1996.

Cohen, Phillip T. et al. "An Open Agent Architecture." In Working Notes of the AAAI Spring Symposium: Software Agents, pp. 1-8, Menlo Park, CA, 1994.

* cited by examiner

OBJECT MANAGER FOR COMMON INFORMATION MODEL

CROSS REFERENCE TO RELATED APPLICATIONS

This is a continuation of U.S. patent application Ser. No. 10/076,166 filed Feb. 13, 2002, now U.S. Pat. No. 6,862,736 which is a continuation of U.S. patent application Ser. No. 09/020,146 filed Feb. 6, 1998, now abandoned.

FIELD OF THE INVENTION

The invention relates generally to the management of device and other information on computer systems or networks, and more particularly to an improved system and method for providing management information to application programs.

BACKGROUND OF THE INVENTION

Network administrators run management applications to perform such tasks as detect machines on a network, inventory software and hardware configurations, and send key information back to a central database. At present, such management applications receive this information from a variety of disparate sources.

By way of example, a typical repository for management and system information is a database. A management application submits a query to a database system, which decomposes and executes against a static storage mechanism such as a database stored in a disk file to obtain results. Alternatively, some management applications interface directly with instrumentation that can pull information from device drivers or other software components. For example, a management application may wish to communicate with remote disk drive software to determine how much free space remains on a network drive.

As a result, to handle disparate devices, management applications need to be capable of dealing with the protocol used by each information source, and have other intimate knowledge of the capabilities of that source. For example, even if a management application is equipped to deal with most common protocols, the application must still have knowledge of the format in which results are returned via that protocol. Further, it often becomes impossible for the management application to be able to manage new devices and components after such an application has been written, since new protocols and management methodology may be introduced for those devices.

However, there are many proprietary frameworks, having no common foundation or consistent view. Existing management applications are unable to handle all of these frameworks and views, especially since proprietary frameworks may change each time a vendor introduces new instrumentation.

SUMMARY OF THE INVENTION

Briefly, the present invention provides a model that enables application programs to receive uniformly rendered results, and provides refinements to that model that improve the exchange of information. The methodology by which such information is retrieved is through a common mechanism, regardless of the source of the information. Thus, the user is isolated from internal components which retrieve this information from various sources and through various other components. Moreover, the common mechanism dynamically adapts to complement the capabilities of the components which provide this information, whereby the information providers may do so in a highly flexible manner.

To this end, a common information model object manager (CIMOM) is provided to, among other things, isolate the client applications from the providers of the information. Among its capabilities, the CIMOM simulates the missing capabilities of providers (to compliment the capabilities of providers) in order to provide uniform rendering of management information to a client application. The CIMOM also is able to decompose a client query (based on an object class) to determine the appropriate source or sources of information (such as one or more providers and/or a static database) necessary to resolve that query. The CIMOM also is able to handle queries having inherited classes by aggregating the property information from the class instances into a result set of managed objects returned to the client in a uniform manner.

Other objects and advantages will become apparent from the following detailed description when taken in conjunction with the drawings, in which:

DETAILED DESCRIPTION OF THE PREFERRED EMBODIMENT

Exemplary Operating Environment

Figure 1:
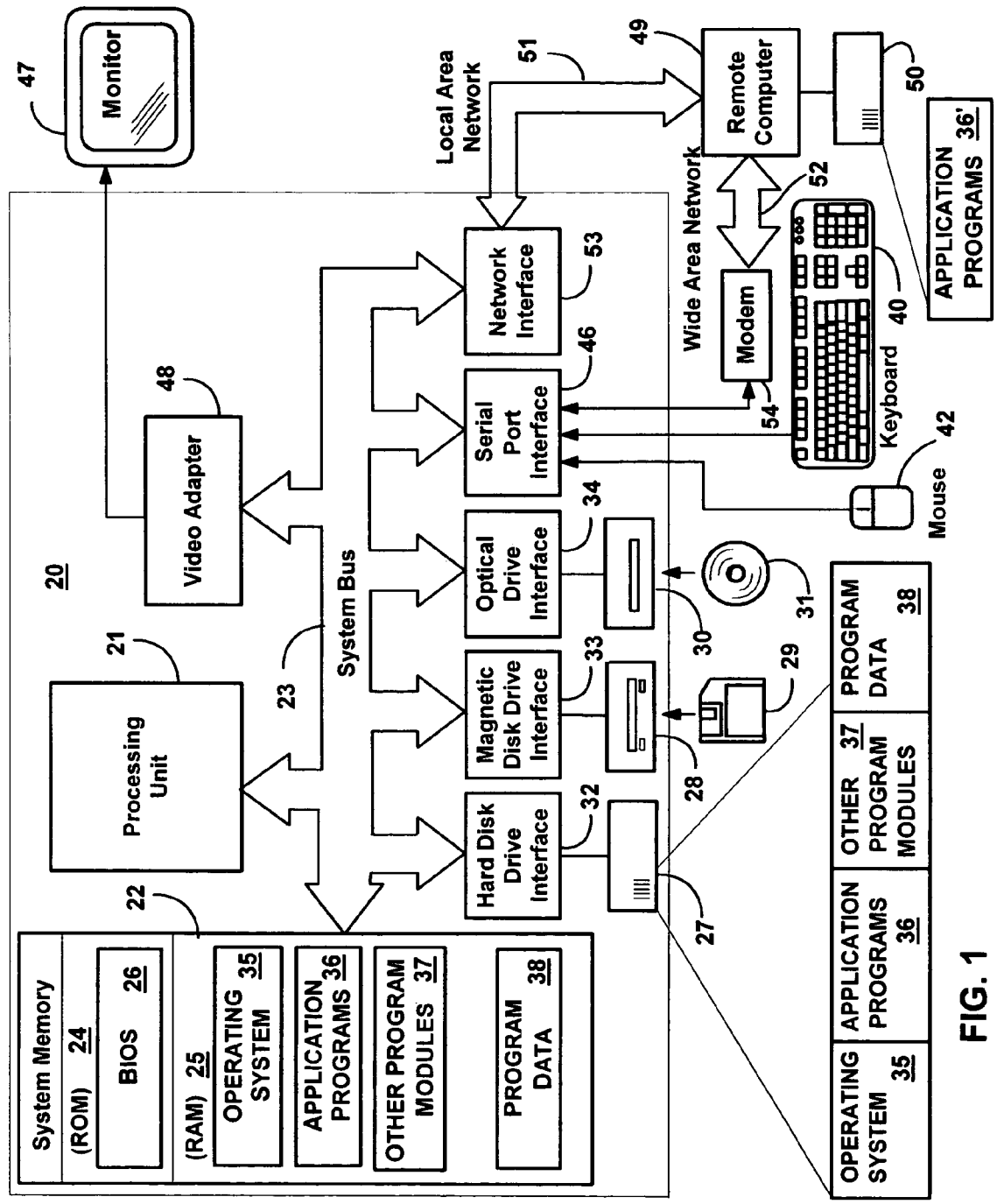
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The Common Information Model Architecture

The general architecture and schema shown hereinafter are directed to consolidating and unifying the data provided by the operating system itself and existing management technologies. Central thereto is a data representation formalism (schema) for managed objects known as the Common Information Model (CIM). In general, in a CIM installation 58 (FIG. 2), a process acting in the role of a client makes management requests, while a process acting as a server satisfies each requested task and returns an appropriate response via uniformly rendered managed objects.

In a CIM installation 58, clients may be simple processes dedicated to the management of particular devices or machines, or, for example, may be general-purpose interactive browsers capable of managing objects. Servers may also be implemented in multiple levels. In high-complexity environments, servers may be running on workstations with complex object stores, and act as proxies for many different managed devices. In lower complexity settings, servers may be simple network devices with no object store, implementing only a subset of a communication protocol. Moreover, the roles of servers and clients may be combined to form hierarchical and/or distributed management. For example, a client can make a request of a server, and that server in turn can switch roles and become a client of yet another server in order to carry out the operation.

Figure 2:
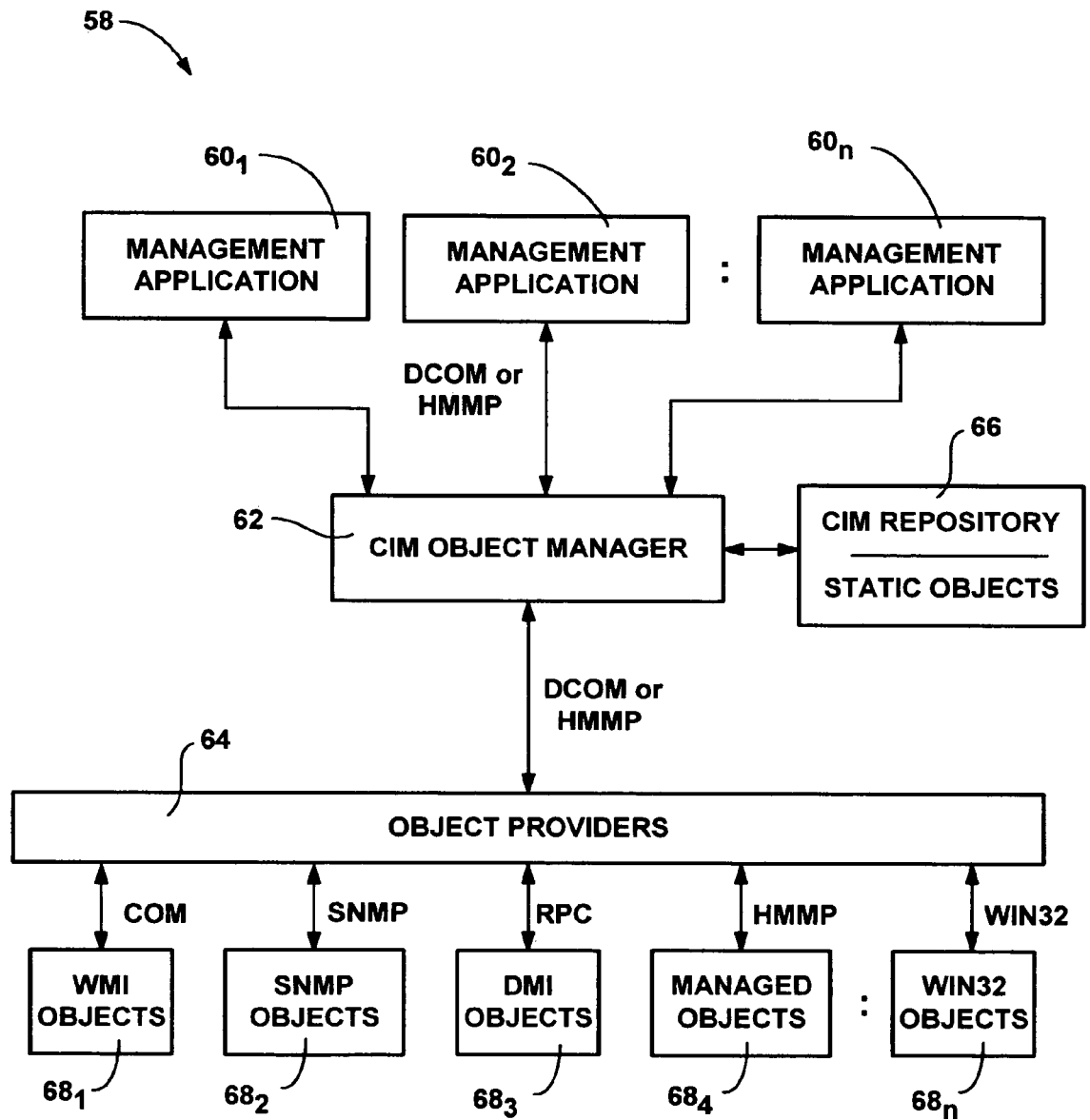
FIG. 2 is a block diagram generally representing the architecture of the common information model for working with management information.
Figure 3:
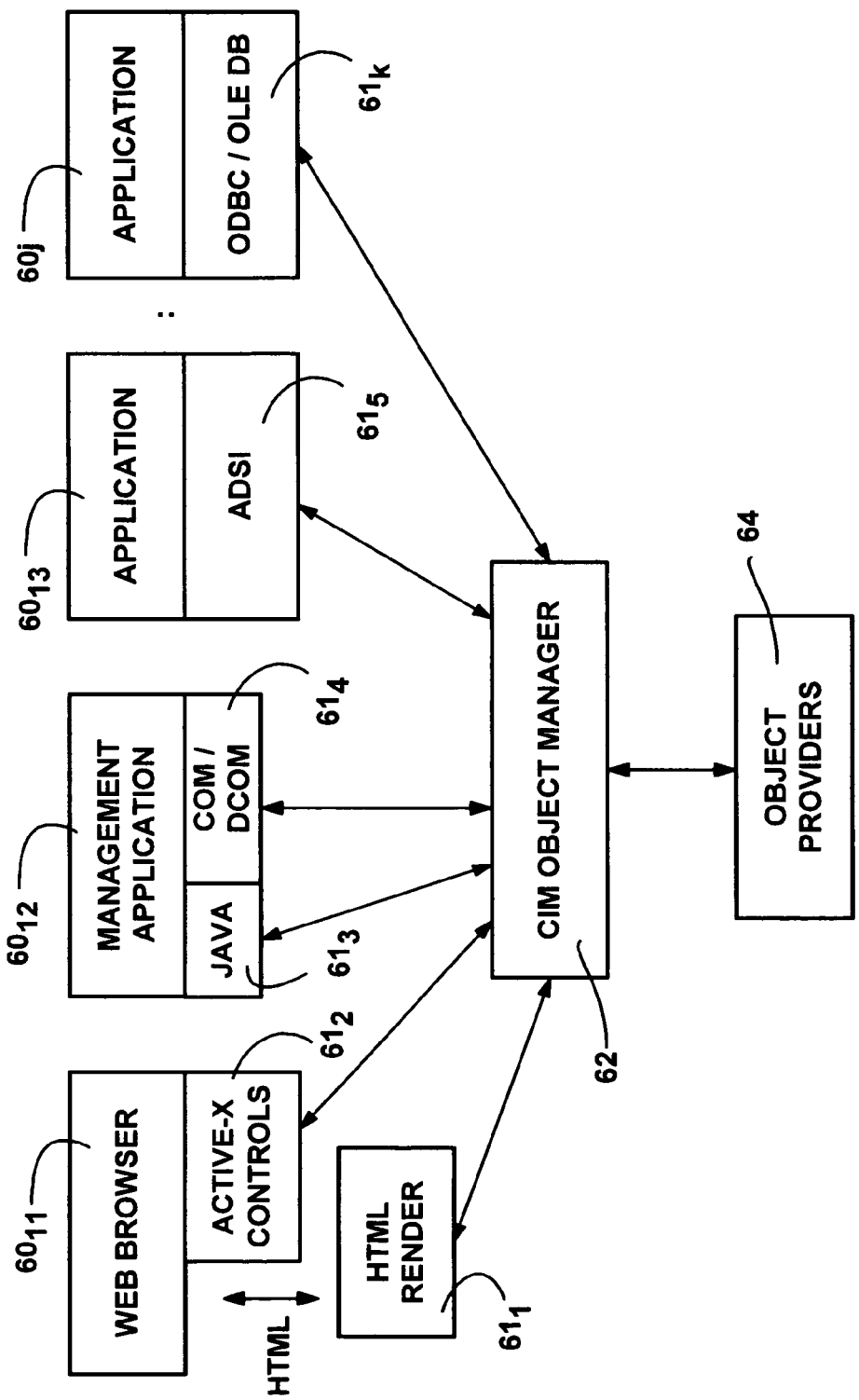
FIG. 3 is a block diagram generally representing an object manager communicating with applications and various providers.

In any event, the general architecture of a CIM installation 58 is shown in FIG. 2, wherein management applications $60_1$-$60_n$ are clients which communicate management information requests with a server known as a common information model Model Object Manager (CIM Object Manager, or CIMOM) 62. Preferably, the client applications $60_1$-$60_n$ communicate with the CIMOM server 62 using the Distributed Component Object Model (DCOM), i.e., by invoking methods of objects in the CIMOM server 62 over an underlying protocol such as TCP. Alternatively, the client applications $60_1$-$60_n$ may communicate with the CIMOM server 62 using the HyperMedia Management Protocol (HMMP). HMMP provides management services across platform boundaries by defining a common network access model, a common schema, and a common security model. Both DCOM and HMMP are well-documented, and as will become apparent below, are not necessary to the present invention, as any protocol capable of passing object information may be used. As such, for purposes of simplicity, DCOM and HMMP will not be described in detail herein, but will generally be referred to as "the communication protocol" unless otherwise specified. Indeed, as further shown in FIG. 3, a CIMOM 62 may be written to communicate with any number of client $60_{1_1}$-$60_j$ through any number of languages, mechanisms and/or protocols $61_{1_1}$-$61_k$.

The CIMOM 62 is a server which implements a large subset of the communication protocol, and which switches roles so as to act as a proxy on behalf of client requests. As part of its function, the CIMOM 62 passes the client requests to appropriate servers known as object providers (or simply providers) 64. Providers 64 typically implement a smaller subset of the communication protocol and do not switch roles. By way of example, one type of provider is a software driver or the like supplied by a vendor to accompany a hardware device such as a disk drive. Note that providers 64 hosted on the same machine as the CIMOM 62 need not use DCOM or HMMP, but may instead use a private interprocess communication mechanism appropriate to the operating system.

In accordance with one aspect of the invention and as described in more detail below, in order to service a request, the CIMOM 62 accesses a CIM repository 66 in order to determine which object provider or providers to contact (if any). More particularly, when a client sends a request to the CIMOM 62, the client will access the CIM repository 66, which may have the information therein if static, and/or will provide the information necessary for locating the appropriate provider or providers which can satisfy the request. Thus, the CIMOM 62 will either directly satisfy a request or become a client itself and forward the request to an appropriate provider 64. Note that the static information (such as object property values) may be maintained separate from the CIM repository (database) of static objects 66, and indeed may also be accessed through a provider 64. However, for purposes of simplicity herein, static CIM information is described as being maintained in the CIM repository or database 66.

In any event, through the CIMOM 62, clients are relieved of the burden of locating and directly managing a multitude of devices on the network. Instead, the CIMOM 62 hides the management complexity by distributing the request to the appropriate providers 64. As shown in FIG. 2, the providers 64 gather the necessary data from the devices $68_1$-$68_n$ using vendor or protocol-specific mechanisms such as DMI, SNMP, CMIP or a proprietary mechanism, and return the data to the requesting CIMOM 62. Providers are components which are essentially more primitive in nature than CIMOM itself. As a result, and in accordance with one aspect of the present invention, in order for CIMOM to present uniform capabilites to the client process, CIMOM simulates any operations not directly supported by that provider by executing a series of more primitive requests which are understood by the provider. CIMOM then renders the results as though the provider had been capable of the original complex request submitted by the client process.

Providers fall naturally into various categories, depending on the types of management capabilities they provide. For example, a provider 64 may be constructed to return only a single dynamic value obtained in real-time from a hardware device. Alternately, a more complex provider might be desirable for a full instrumentation of a series of similar complex devices, such as network routers. In both cases, the resulting server is primarily thought of as a provider, since the instrumentation is dedicated to a narrow range of capabilities.

Thus, there are static providers, which are object class instances (described below) imported into and resident in the CIM database 66. For example, the name and description of an application, or the vendor and release level of a PC card both comprise information which is available at installation time and rarely ever (if at all) changes thereafter. There are also property providers, which are capable of providing and setting single property values, given a static definition of the class and instance as described below. As also described below, there are instance providers, which are capable of providing multiple keyed instances of a particular class or classes, and class providers, which are capable of providing new CIM classes describing CIM objects. Lastly, there are namespace providers, which are capable of providing new namespaces (described below) into the model that group objects in a particular manner. Other providers are feasible, and any given Provider can be any combination of the above types.

Unlike individual providers, a CIMOM 62 typically acts as a proxy to many providers 64, allowing the client 60 a single point of management for a wide range of manageable objects $68_1$-$68_n$. Thus, to an extent, a CIMOM 62 may be considered a centralized "provider" of other providers, although the primary purpose of the CIMOM 62 is to isolate applications from providers.

The Common Information Model (CIM) defines the model used to represent the real-world objects being managed. CIM uses an object-oriented paradigm, wherein manageable objects are modeled using the concepts of classes and instances. The logical view of CIM is similar to the view of an object-oriented database, in which protocol operations carry out changes to this schema. For example, the Put Class protocol operation is used to create a class definition within the targeted server, while the Get Instance operation retrieves an object from the server that describes a particular instance of some managed object, such as a network device. The components of CIM, such as classes, instances, and qualifiers can be conveniently described in a textual format known as Managed Object Format (MOF), as shown below.

The meta-schema objects of CIM are components used to model a managed object using CIM. The objects present are classes, instances, properties, and qualifiers. Classes are models or templates for manageable objects, while instances are occurrences of classes, properties are the individual fields of classes or instances, and qualifiers are modifiers of any of these. In CIM, objects are essentially representation objects, i.e., the data object manipulated by a user of CIM is typically a proxy or representation of a real device. Locally, the server binds the representation object to the real-world device through various instrumentation methodologies specific to a particular system.

By way of example, the CIM installation 58 may include a Printer object, however, the object is not the actual printer, but a model of a printer. Performing an operation on the Printer object, such as examining its "Status" property, appears as a simple database query to retrieve the value, but the local implementation may in fact invoke systems software in real-time to retrieve the value of the Status property. Thus, CIMOM has presented the device and its status values in the form of a "vitualized" database.

In accordance with another aspect of the present invention, whether CIM objects are purely data or tied to devices through instrumentation is not relevant to their appearance to a CIM client. CIM objects, being representation objects, are treated in a uniform manner as objects within the schema, whether or not there is an object store, instrumentation, or a mix of both.

The basic definition of a unit of management is the class. A class is a named, structured data type, containing individual data item fields called properties. A class is a template for a representation object for a set of devices which match the class definition. By way of example, the MOF definition for an exemplary class called "Disk" might appear as in the table below:

```
Class Disk
{
  string Volume;
  string FileSystem;
  uint32 TotalCapacity;
  uint32 FreeSpace;
};
```

This class models a disk wherein the four property fields describe individual aspects of a disk. While most classes are representation objects for real-world devices, there is no restriction on the content, or the application of the class to a particular managed object, although a particular CIM implementation may place limits on the number of properties in a class, the types of properties, or other similar limits. Once published, class definitions are immutable and universal, and thus changes are typically effected by either derivation from existing classes or creation of new classes. Note that because of the shared and distributed nature of classes, changing a class definition has the potential to impact managed entities that are currently deployed.

As in object-oriented paradigms, classes can be derived from superclasses. A derived class implicitly inherits or contains the entire contents of the superclass. For purposes of simplicity, the present CIM meta-model supports single inheritance only, although more complex inheritance models are feasible. As used herein, the terms base class and superclass may be used interchangeably to indicate a parent, while the terms derived class or subclass may be used to indicate a child class.

The fields of a class definition are called properties, and are named values subject to naming guidelines in a CIM implemenation. A wide range of sized integer types are supported (both signed and unsigned), along with IEEE four and eight byte floating point values, UNICODE strings, dates and times, and other known types. Further refinement of the semantics of property values is achieved through the use of qualifiers, described below. By way of example, qualifiers applied to properties may give additional semantics of properties, such as whether a 32-bit integer is actually a 'counter' or a 'gauge' property type.

A class defines a template for describing managed objects. Based on a class definition, specific managed objects are defined using instances of that class. Where the class models the real-world device or component in the general sense, each instance represents a specific occurrence of the class. Continuing with the above example in which a general class called Disk was described, an instance of this previously described Disk class might appear in the MOF syntax as in the table below:

```
Instance of Disk
{
  Volume = "DISKC";
  FileSystem = "XFS";
  TotalCapacity = 240000000;
  FreeSpace = external;// Dynamically supplied by instrumentation
};
```

Note that since the FreeSpace parameter is highly volatile, in a typical implementation the value would be supplied by a provider 64, rather than being a stored or static value. As described in more detail below, the CIMOM 62 is capable of retrieving both the static and dynamic information from various sources including the CIM database 66 and/or appropriate providers 64, and returning the object instance to the application 60. In keeping with one aspect of the present invention, the database 66 and/or providers 64 provide their portion of the information without knowledge of its final destination, i.e., the identity of the client process, and the application receives this information transparently, i.e., as instances of the class disk without knowledge of its actual source or sources.

A Qualifier is a modifier applied to a class definition, an instance, or a property. Qualifiers constitute meta-data, and are generally, though not necessarily, non-essential modifiers, in that removal of the qualifier should not substantially change the meaning of what was being modified. In MOF syntax, qualifiers are indicated by preceding a list of declarations, delimited by square brackets, as shown in the table below:

```
[description("This class models a disk")]
class Disk
{
  string Volume;
  [description("The name of the filesystem")] string FileSystem;
  uint32 TotalCapacity;
  uint32 FreeSpace; };
```

While the above qualifiers give additional information, their removal does not invalidate the definition of Disk. The presence and values of qualifiers may vary between CIM installations, even for the same class definitions. In general, if removal of a qualifier would seriously alter a class or instance definition, then that qualifier should be re-implemented as a property. Any number of user-defined qualifiers may be applied to class definitions, instances, or any of the properties.

As in relational database models, instance identification is done through the use of keys. Using the table and column model common to relation databases, the table corresponds to a CIM class, and the rows correspond to CIM instances. The column or columns which uniquely identify the row are designated as keys. Key properties are designated by attaching a qualifier named 'key' to each property that constitutes the key for the class. Key qualifiers can be attached to more than one property to create a compound key. Using the MOF Syntax as an illustration, the Volume property has been designated as the key for the Disk class as shown in the table below:

```
Class Disk
{
  [key] string Volume;
  string FileSystem;
  uint32 TotalCapacity;
  uint32 FreeSpace;
};
```

The above definition of Disk specifies that the Volume property is used to distinguish instances within the class Disk (and its derived classes), and that there is one unique value of Volume for each real disk on the machine. The other property values can be duplicated across instances. For example, many volumes could support the same FileSystem or TotalCapacity values, and thus such properties would be poor choices for instance discrimination.

Certain rules for selecting and using keys apply. For any given class hierarchy, once a key has been introduced it may not be overridden or supplemented by any derived classes. For example, an abstract class SystemElement could be introduced which defines no properties at all, so it would be legal to derive several other classes from it, each introducing their own particular key values. However, no derived classes of each of those subclasses could in turn introduce their own keys. In sum, classes inherit the key of any superclass, if there is one, and only if there is not a key value in the superclass chain is a class permitted to introduce its own key.

Since CIM instances belong to a class and reside in a particular namespace (described below) on a particular host, some method of locating or referring to a particular object is required. This takes the form of an Object Path, which is conceptually similar to a URL (Uniform Resource Locator). Object paths come in several varieties. They can be relative to a particular server, relative to the entire network, or relative to a particular namespace, just as file paths in a file system may be relative to a particular sub-directory or volume. As an illustration, a full network-relative object path might appear as //myhost/root/default:disk.volume="C", wherein the first field after the leading double-slash is the server address (network address or host name, i.e., "myhost"). This is followed by the relevant namespace ("root/default") within that server, and the class ("disk") of the desired object. Finally the key values (the property "volume" whose value is "C"), which uniquely designate that instance within the class, are specified.

A Namespace is a fundamental grouping unit for sets of classes and instances. A namespace has an effect on the scoping of classes within it. By default, the instances of a class are private to a particular namespace, i.e., instances with the same key may exist in another namespace, but two instances of a class with matching keys are considered to be the same instance within a namespace. By default, a class definition is private to each namespace. However, any given class, while present in more than one namespace, may not have a definition which is at variance from its definition in another namespace.

A system is permitted to have single copies of class definitions for its supported namespaces and use reference counting or other mechanisms for the sake of efficiency. Namespaces can be nested in a manner similar to a hierarchical file system. In relational database terminology, a Namespace is similar to a database, except that nesting is possible. The base namespace for all CIM implementations comprises the classes and instances constituting the representation objects for the local host device or machine.

Namespaces can be manipulated through the use of the standard system class _Namespace. Creation of an instance of class _Namespace results in the creation of a real logical namespace within the CIM implementation. Note that there are two objects involved, the representation object and the actual namespace itself. Thus, an instance of _Namespace is a representation object for a real database namespace. Deletion of the _Namespace object results in deletion of all the classes and instances within that Namespace as well as deletion of the Namespace itself. Querying for instances of _Namespace is equivalent to querying for the actual list of namespaces supported by the CIM installation.

A special type of property called a reference is supported within CIM. This property is a "pointer" to another class or instance within the schema. A reference takes the form of a string which contains an object path. A special type of class which contains a pair of references is called an Association. Instances of association classes are used to set up a binding relationship between two other objects. For example, while it is possible for each of objects A and B to contain reference fields which point to each other, this would entail designing the class to contain a reference property from the outset. In many cases, it may not be known at class design-time which objects may require references to each other. Instead, classes are ordinarily designed to contain no assumptions about relationships in which they may participate. Instead, an association class C can be created after classes A and B are created, wherein C can contain two reference property fields, one which is designated as pointing to instances of A, and the other as pointing to instances of B. In this manner, associations can be used to create object relationships without the knowledge or participation of the objects themselves. Likewise, relationships can be removed without affecting the objects.

In a more specific example, it may sometimes be useful to associate a NetworkCard object with a NetworkProtocol object using a dedicated association class called NetCardToProtocolBinding. This is a desirable model, since a card may support more than one protocol, and the same protocol may be running over more than one network card on the host machine. The association objects describe the complex relationships without the more primitive objects being aware of it.

In order to deal with queries in a uniform manner, the CIMOM supports the Execute Query protocol operation and preferably supports at least a minimal subset of ANSI SQL. Of course, additional query languages may be supported. In general, SQL specifies the syntax for a simple form of 'select' statements for executing read-only queries. Using this syntax, CIM classes (which may be stored in the CIM repository or retrieved from some source on the network) are represented as tables and CIM properties as columns, resulting in a natural SQL-like mapping. The result set of such a query is always a set of CIM instances.

By way of example, assume an administrator wants to locate all network disk drives that are running low on free disk space. Through a management application 60, the administrator submits to the CIMOM 62 an SQL query, —"select * from LogicalDisk where FreeSpace<20000000"—. In accordance with one aspect of the present invention and as described in more detail below, the CIMOM 62 works in conjunction with one or more providers 64 and complements the capabilities of the providers to return a result set comprising uniformly rendered managed objects. For example, the provider may not be capable of processing queries in high-level languages such as SQL, but may only be able to return a list of all the instances it supports. In this case, CIMOM will transparently translate the user's high-level query into a series of simple retrievals and then perform the query internally on behalf of the user, giving the user the impression that the provider directly supported the query. Thus, the above-query results in a set of CIM objects (instances) of class LogicalDisk where the property value for FreeSpace is less than twenty million bytes.

Each operation within the CIM schema is modeled as a separate protocol operation. For example, most servers acting as CIMOMs will support class creation and update, class retrieval, class deletion, and instance creation and update, instance retrieval, instance deletion, and query execution. Each of these has a corresponding protocol operation. Servers acting as providers may only support one or two operations, such as "Get Instance" and "Put Instance." For example, to retrieve an instance of a particular class, the protocol operation "Get Instance" is used. Once the instance is obtained, it may be necessary to consult the class definition itself, and so a "Get Class" operation is executed.

Lastly, in a distributed environment, a client will construct a request packet for the desired protocol operation and send it to the server using an underlying network transport protocol, such as TCP. The reply packet or stream typically contains the result of the operation, or an error packet detailing why the operation could not be completed.

Operation of the CIM Object Manager

In accordance with one aspect of the present invention, in response to a query, the CIM object manager 62 is capable of retrieving information from various providers and static sources as necessary to satisfy the query. To this end, the object manager 62 receives potentially high level SQL queries, decomposes those queries as necessary, and communicates with a variety of sources, possibly in a series of very primitive operations, to produce a result. The operations are transparent to the client, as the result is returned in the same manner regardless of the sources that supplied the information.

Figure 4:
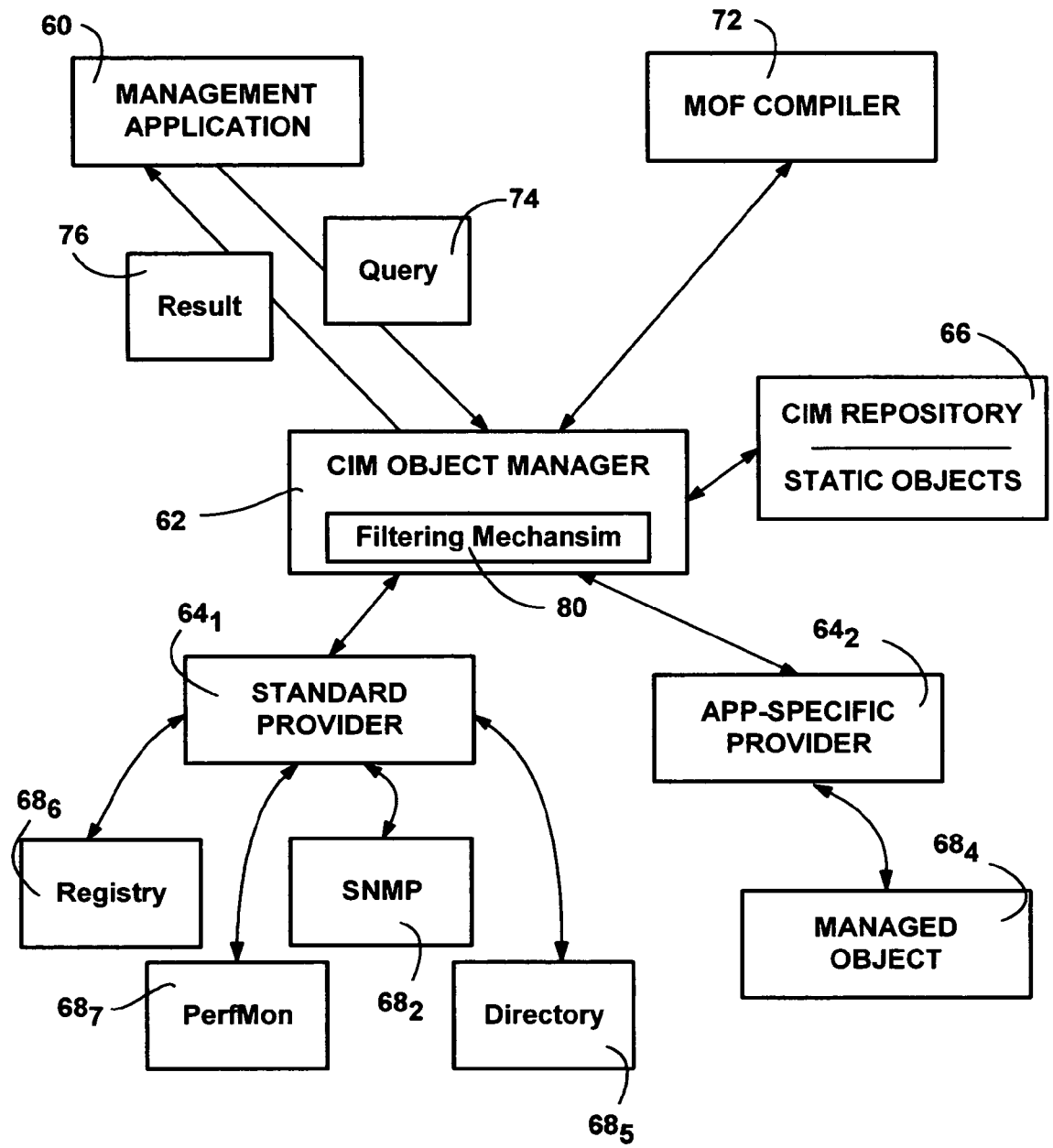
FIG. 4 is a block diagram generally representing the object manager decomposing a client query to locate various providers for returning a result to the client.
Figure 5:
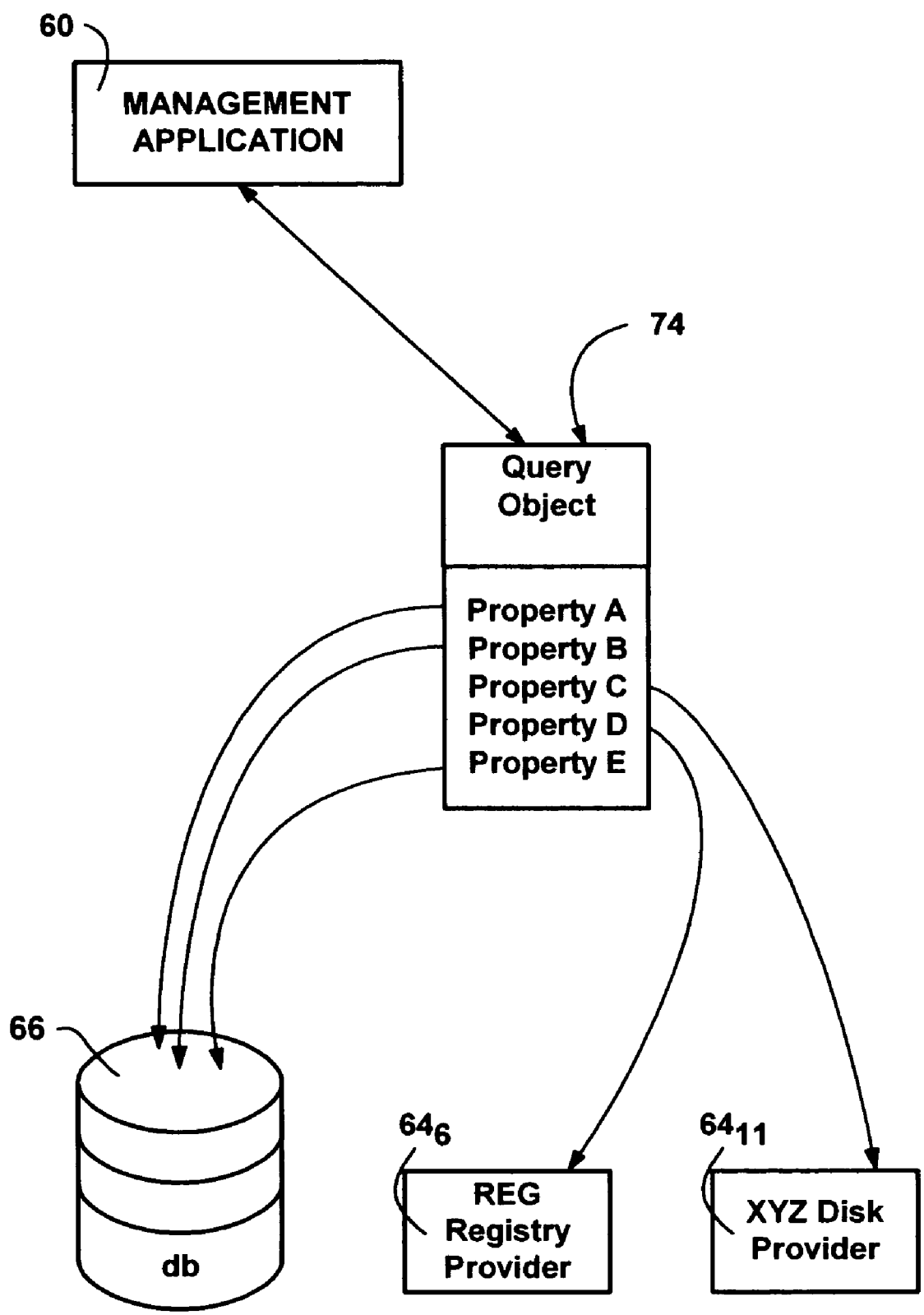
FIGS. 5 and 6 are diagrams generally representing how the object manager decomposes a client query to locate property values for returning a result to the client.
Figure 6:
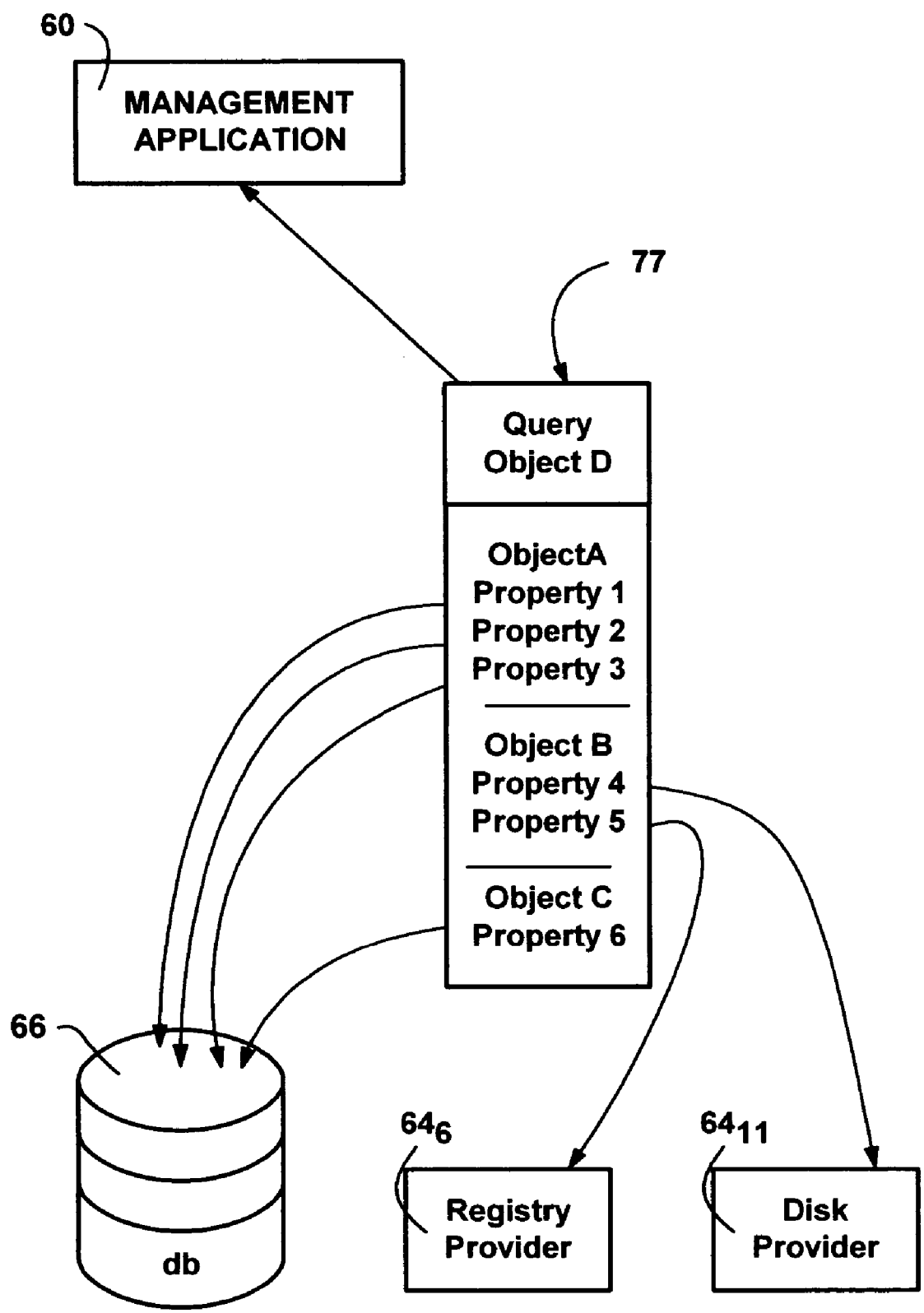

FIGS. 4-6 show the general decomposition of a query. When the management application 60 sends a query 74 to the CIMOM 62, the query may be of arbitrary complexity. By way of example, assume the query is—select * from Diskplus where Drive="c:"—, thus requesting all the information from a class called Diskplus for the c: drive, where the class Diskplus is shown below:

```
[dynamic, provider ("XYZ")]
Class Diskplus
{
    [key] string Drive;
    string VolumeID;
    [dynamic FreeSpace];
    [dynamic, provider ("REG") MfrID
    uint32 TotalCapacity;
};
```

The CIMOM 62 receives and analyzes the query 74, locates the class diskplus via its class repository 66, and recognizes that some of the information is static and exist on the CIM database 66, while other information is dynamic and is to be retrieved from dynamic instance providers. Dynamic instance providers are registered in the CIMOM namespace for which it provides instance values. Preferably, dynamic instance providers are COM objects with a CLSID.

The CIMOM 62 locates the appropriate providers in its class repository 66 and as represented in FIG. 6 (properties A, B and E), obtains any static data in the query from a database, e.g., the same CIM database 66 (FIG. 4). For example, using the "c:" drive as the key, the volume ID and total capacity may be located in the static database 66. However, the freespace value is volatile, (shown in FIG. 5 as property D), and is instead obtained by communicating with a disk provider 64 named "XYZ," while the manufacturer ID (property C in FIG. 5) is obtained by communicating with a "REG" registry provider $64_6$. Thus, by decomposing the query, through a combination of static lookups and communicating with dynamic instance providers, the CIMOM 62 is able to return a result 76 comprising a set of CIM objects (instances) of the class Diskplus that satisfy the query.

Note that queries may identify classes of objects that include other objects therein (i.e., via inheritance). Thus, as shown in FIG. 6, a different query 77 may specify an object of class D that inherits classes A, B and C, each having properties with instances located from different sources. Even with such a potentially sophisticated query, the CIMOM 62 is able to obtain the correct result by decomposing the query into the various classes and thereafter into provider identities and static information, and then by communicating with those providers to obtain the correct results. Regardless of how the result set is completed, the operation is transparent to the client, who receives uniformly rendered managed objects.

Moreover, in a class, an additional tag may be placed on a property that specifies an override on a particular property. For example, after going to provider xyz and getting the instance of a class, the override instructs the CIMOM 62 to call another provider and override a property based on the information returned from the other provider. For example, the FreeSpace property may be tagged such that after the "xyz" (e.g., a generic) provider returns the freespace, an "abc" provider (e.g., belonging to a vendor having an intimate knowledge of the drive) should be contacted to override that property with its value.

Figure 8:
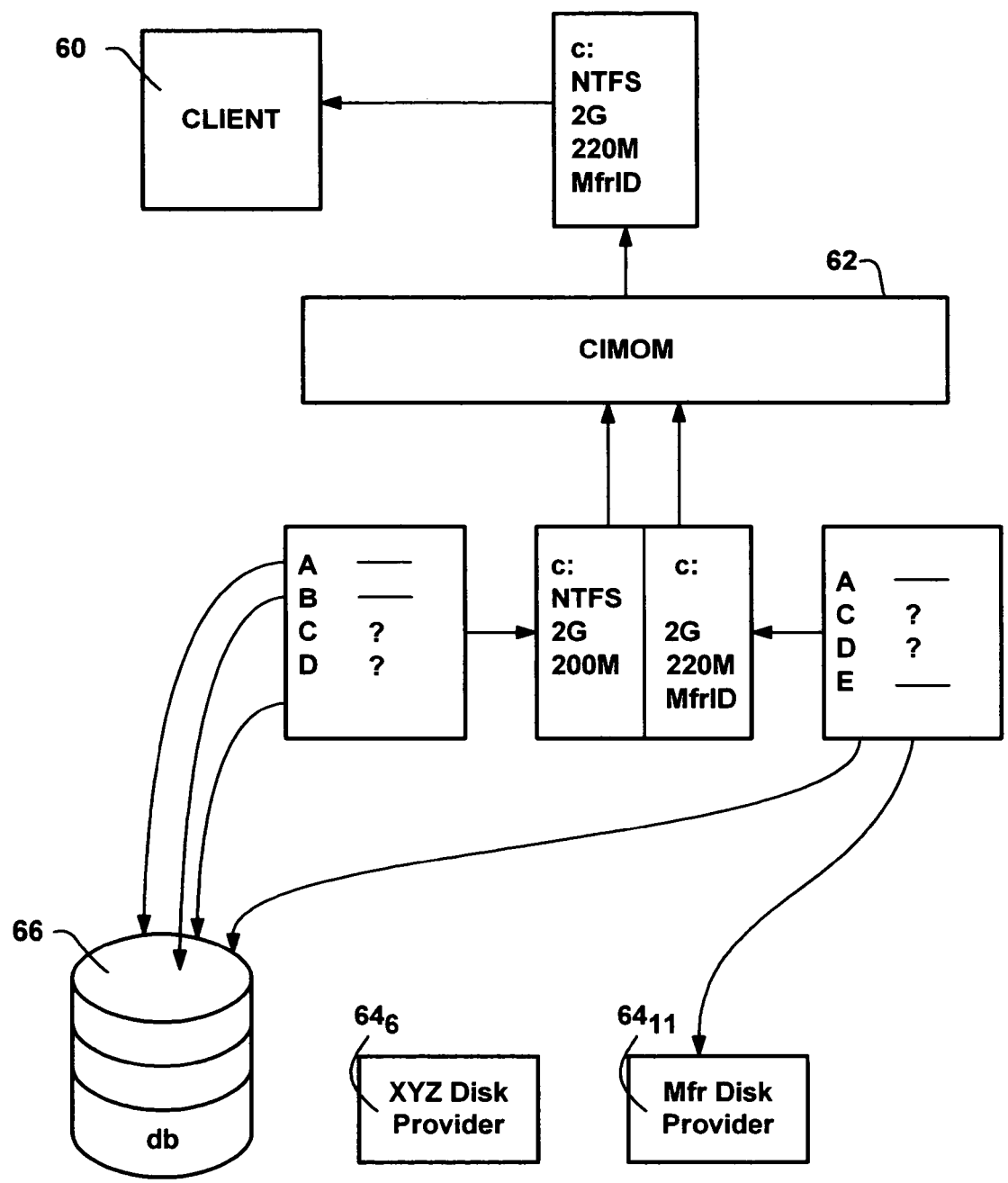
FIG. 8 is a diagram representing how the object manager aggregates properties located for a class with an inherited classes.

As can be appreciated, because of the inheritance capabilities of objects, it is thus possible for an object to have the same property value supplied by two or more providers and/or the static database. In accordance with another aspect of the present invention, the CIMOM provides a mechanism for aggregating multiple properties so as to provide the uniformly rendered result. By way of example, assume a class "Mfr" inherits the class Disk, i.e., Mfr:Disk. However, as shown in FIG. 8, when values for of the properties of each class are retrieved, some of the properties are common, and potentially have different values, since one class may specify one provider while another specifies a different provider for that same property. Note that in FIG. 8, a line indicates a static property that is to be retrieved from the database, while a "?" indicates a dynamic property retrievable from a provider.

The CIMOM 62 decomposes the query as described above, and retrieves the properties. To consistently handle conflicts, the CIMOM 62 keeps the deepest of those common properties in the inheritance chain. Thus, as shown in FIG. 8, the CIMOM 62 aggregates the A, B, C, and D properties of the Disk instance (having values c:, NTFS, 2G and 200M, respectively), with the A, C, D and E properties of the Mfr instance (having values c:, 2G, 220M and MfrID, respectively). The joined result set properly includes properties A through E, with any common values kept from the Mfr instance since that instance is deeper in the inheritance chain. Note that the CIMOM 62 may also do some processing to optimize the returning of each set of properties, e.g., do not twice ask for the same static property value.

Moreover, other information including the class of an object or the identity of a provider may be nested in other providers. For example, instead of returning the CLSID of a dynamic instance provider identified in a class, the database may return the CLSID of a class provider. From that information, the CIMOM 62 may obtain the class information dynamically, and then use that information to locate the dynamic instance provider necessary for resolving a query. Indeed, the entire schema is dynamic, as each provider can be property, instance, and so on.

Note that queries need not request all of the information in a defined class, but may potentially request of subset of instances that match a query based on that class. For example, the query—select * from LogicalDisk where FreeSpace<20000000—intends to have returned only instances that meet the less than twenty megabyte criteria, and not all instances of the LogicalDisk class. In accordance with another aspect of the present invention and as described below, the CIMOM 62 provides the correct result set by a post-retrieval filtering operation, by submitting the query to a provider that is capable of handling queries, or some combination of both. Thus, the CIMOM 62 includes a filtering mechanism 80 that examines each of the resulting instances and discards those that do not properly satisfy the query. Again, regardless of how the result set is completed, the operation is transparent to the client, who receives uniformly rendered managed objects.

Thus, in accordance with another aspect of the present invention, the CIM object manager performs operations that compliment the capabilities of providers in order to uniformly render managed objects to management applications. For example, if one provider 64 supplies too much information with respect to a query, the CIMOM 62 examines and filters the unnecessary information in order to provide a managed object that includes the correct information relative to the query.

However, some providers have substantially more capabilities than other providers. For example, one provider may simply enumerate all of the information it has, while another provider may be able to handle queries and return specific information. For reasons of efficiency, the CIMOM 62 attempts to operate the provider with its maximum capabilities. Note, however, that the CIM is flexible in how the various types of providers produce information. Indeed, the clients request a full variety of services (e.g., Get/Set, Enum Instances, Enum Classes, Exec Queries, Generate Events and so on), and regardless of the requested service, the CIM Object Manager provides the appropriate response. However, if a provider does have some capabilites, the CIMOM 62 dynamically adapts to complement the capabilities of the components which provide this information. As such, information providers may provide information in a highly flexible manner.

By way of example, assume a management application 60 submits a query requesting the return of all files on drive d: having *.exe as an extension and that are less than 200 kilobytes in size. A simple provider may not be able to handle such a query, but instead is only able to return the entire contents of all drives on the system. A slightly more sophisticated provider might be able to find the instances of a class by its path and return it (and thus for example return the files on only drive d:), but is not able to filter the result set by file extension or size. An even more sophisticated provider is able to return an exact result set in response to the query.

In accordance with another aspect of the present invention, the CIMOM 62 dynamically adjusts to the capabilities of the providers 64 in order to efficiently return the correct result. Thus, in the first example wherein the machine's provider simply enumerates all files on all drives, the CIMOM 62 performs the filtering and discards the results other than d:*.exe files less than 200 kilobytes. As can be appreciated, this may result in a significant amount of information being transferred from the provider 64 to the CIMOM 62, and is thus ordinarily less efficient than having a smaller result set for the CIMOM 62 to start with, such as via a more sophisticated provider described above. In keeping with the invention, however, the application receives the same result set from the CIMOM regardless of the capability of the provider on the machine.

Figure 7:
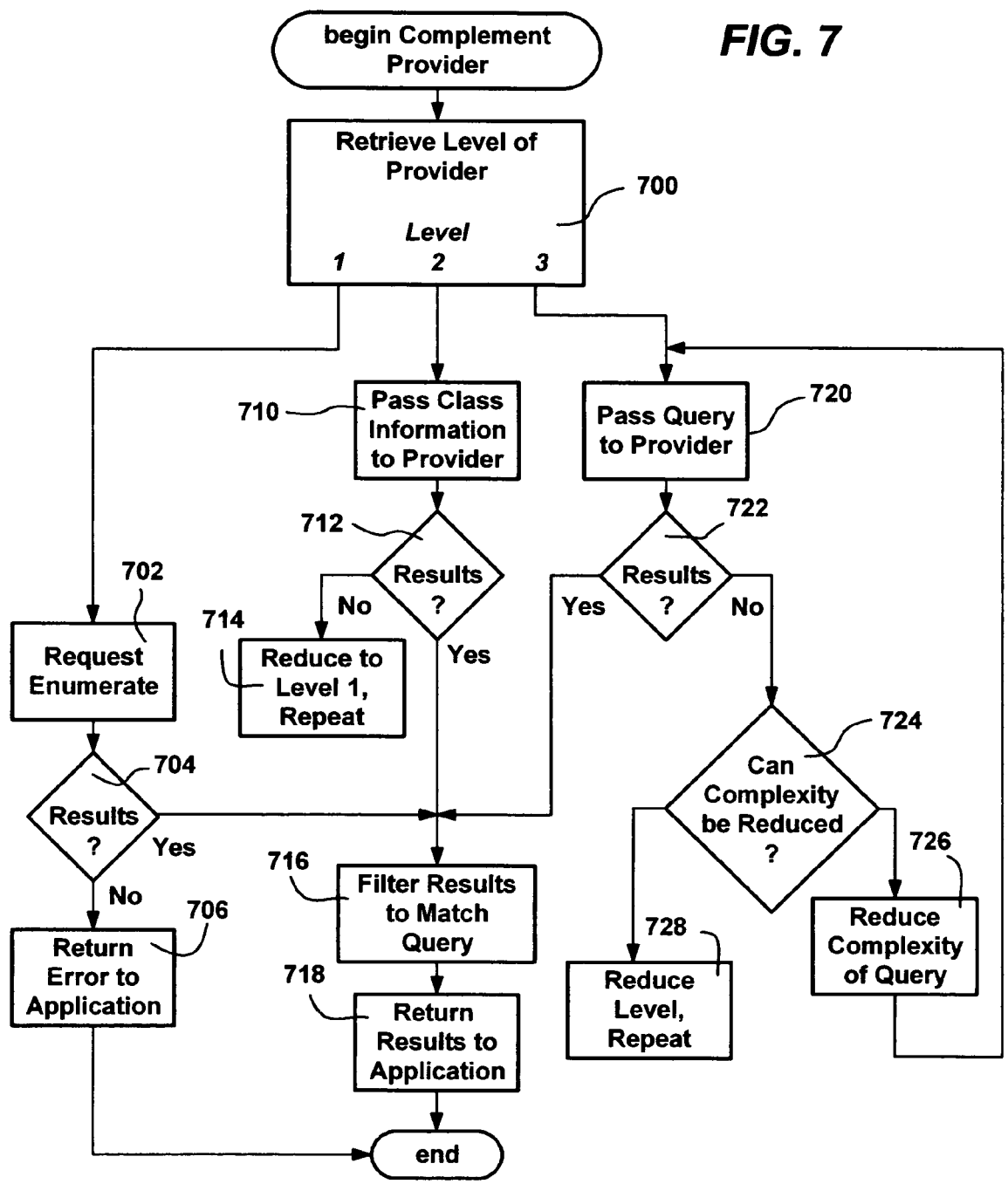
FIG. 7 is a flow diagram representing the general steps taken by the object manager to complement the capabilities of a provider.

FIG. 7 generally represents how the CIMOM dynamically adjusts to the capabilities of a provider, and more particularly, to a dynamic instance provider. To facilitate this operation, providers have been separated into three levels based on their general retrieval capabilities resulting from the COM object methods therein. As used herein, a level one provider is one that can enumerate all instances of a given class, (which can occur in a synchronous or asynchronous manner depending on the method invoked). A level two provider is one which can find an instance by an object path and return the instance, again, either synchronously or asynchronously. Lastly a level three provider is one which can (synchronously or asynchronously) execute SQL queries against the instances provided.

Beginning at step 700, the CIMOM 62 first determines the level of the provider 64. This may be accomplished by retrieving the level information from the database 66 wherein the provider information is maintained. As will become apparent below, this may also be accomplished by initially assuming that the provider is a level three provider, and then reducing the level as necessary until the provider returns a result. If the provider is a level one provider, then step 702 is executed wherein the CIMOM the CIMOM simply asks for a return of all information available to the provider, since this is all that the provider is capable of doing. For example, the CIMOM may invoke a method of the provider requesting enumeration of all the instances of a class. If successful, the results are returned at step 704, otherwise an errorcode or the like is returned, and at step 706 the application is informed of some error in the system, (e.g., the provider code may have become corrupted).

If successful, the enumerated instances are provided to the CIMOM 62, which then filters those instances to match the query. The CIMOM 62 includes an SQL-capable filtering mechanism 80 (FIG. 4) for this purpose. Once the proper result set is obtained, the results are returned to the application at step 718. Of course, since the filtering process may be lengthy, rather than wait for the complete result set to be filtered, the CIMOM 62 may begin returning some of the results (instances) while the rest of the filtering is taking place.

If the provider is a level two provider, then step 710 is executed wherein the CIMOM passes the class information to the provider and requests the particular instances of that class. If successful, the results are returned at step 712, and steps 716-718 are performed as described above to filter the results and return those results to the application. If the provider was unable to provide the expected results and instead returns an errorcode, the CIMOM 62 then reduces the level of the provider to level one and this time requests an enumeration of all instances (e.g., branches to step 702). Note that lowering the level may entail writing information into the database 66 for this provider indicating an inability to properly operate at the previous level.

Lastly, a provider may be a level three (query-capable) provider which results in step 700 branching to step 720. Step 720 passes the query to the provider, and step 722 tests for results. Via a return code, a query-capable provider may return one of three responses to a request, either it exactly resolved the query, it did not exactly return the query, or it was unable to resolve the query in its present form. Note that if the provider returns information informing the CIMOM 62 that it did not exactly resolve the query, the provider returns more results than requested (a superset), never less (a subset).

In the event that either the exact set or a superset thereof was returned, the CIMOM filters the results at step 716 before returning the results to the application at step 718. Note that while an exact result set should not need to be filtered, the CIMOM scans the set anyway to double-check that the provider correctly interpreted the query.

In the event that the provider was unable to return the query, step 722 branches to step 724 to determine if the complexity of the query can be reduced. For example, a certain provider may be able to handle most SQL queries, but is unable to resolve a few. Rather than simply bypass the capabilities of such a provider, the CIMOM attempts to reduce the complexity of the query at step 726. Similar to the above example, assume a query asks for all files on drive d: having *.exe as an extension and that are less than 200 kilobytes in size, and only those created before Apr. 1, 1996. If a particular directory provider handles most file-based queries, but is unable to work with date information, the complexity of the query may be reduced at step 726 to remove this part of the query. As can be appreciated, such a query is still far more efficient than simply asking the provider to enumerate all files on drive d:, or simply all files on all drives.

Note that step 726 may itself comprise an algorithm that attempts various permutations of query criteria each time through the loop for a given query. Alternatively, (or in addition), step 726 may look-up (and also store) certain information about a specific provider that instructs the CIMOM 62 in how to reduce the complexity of a query for that provider. For example, the knowledge that a certain provider cannot handle queries with date information may be detected and stored for future complexity-reduction operations.

After the complexity of the query is reduced, the new query is passed to the provider at step 720. The process continues looping until either some results (exact set or superset) are returned (step 722), or the complexity of the query can no longer be reduced (step 724). If results are returned, steps 716-718 are executed as described above. Note that if a query of reduced complexity is given to a provider, a superset of the desired result set is actually returned, even when the provider indicates that it exactly resolved the (reduced) query. Nevertheless, the filtering by the CIMOM 62 completes the complementing of the capabilities of the provider to return the exact result set to the application.

If at step 724 the complexity can no longer be reduced, the provider may be considered a level one or two provider and the process repeated from step 700 in an attempt to obtain some suitable results.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system for providing system information to a client, comprising, one of more storage mediums;

a plurality of providers, each provider corresponding to a source of system information and including a provider access interface;

a repository, the repository including data that identifies which of the providers provide system information that a client may request; and a manager that isolates the client from the providers, including an access interface that receives a client request for system information, the manager configured to:

receive a client query;

determine a capability level of a provider of information for satisfying the query based on providing the client query to the provider and evaluating a response from the provider;

simplifying the query, if the response indicates the provider cannot handle the query;

providing a request for information to at least one source of data based on the capability level thereof;

receiving data from the at least one source; and returning information corresponding to the data in response to the client query.

2. The system of claim 1 wherein the manager communicates with a plurality of providers corresponding to a plurality of sources of the system information, and wherein at least one of the sources communicates via a protocol that is different from a protocol of at least one other of the sources.

3. The system of claim 1 wherein the data returned to the client is provided in an instance of an object.

4. The system of claim 1 wherein the manager receives data from at least two of the providers and aggregates the data into an aggregated response to the client request.

5. The system of claim 4 wherein at least some of the data is dynamic data obtained by one of the providers.

6. The system of claim 5 wherein at least some of the data comprises static data obtained by the manager.

7. The system of claim 5 wherein at least some of the data comprises static data obtained by the manager, and wherein the manager communicates with the repository to obtain the static data.

8. The system of claim 1 wherein the manager includes a filtering mechanism for filtering selected data received from at least one of the providers.

9. The system of claim 1 wherein the client request comprises a single query, and wherein the manager separates the client request into a plurality of separate requests, and for each separate request, accesses the repository to determine whether a provider is needed to satisfy the separate request, and if so, to communicate with that provider to obtain the requested system information.

10. The system of claim 9 wherein at least one of the separate requests corresponds to static data maintained in the repository.

11. A computer-implemented method, comprising:

receiving a query from a client seeking system information, the query including object class information;

isolating the client from each source of information needed to respond to the query~ including:

a) locating a class corresponding to the object class information;

b) decomposing the query into properties of the class, and, for each property:

(1) determining if the property has a corresponding property value stored in a static source or if the property value is obtainable through a provider, (2) the property value is stored in a static source, retrieving the value from that source, and (3) if the property value is obtainable through a provider:

(i) determining a capability level of the provider based on providing the client query to the provider and evaluating a response from the provider, (ii) simplifying the query, if the response indicates the provider cannot handle the query, and (iii) receiving the property value from the provider;

c) placing the property values into a result set, and d) returning the result set to the client.

12. The method of claim 11 wherein placing the property values into a result set comprises, writing property data into an object instance.

13. A computer-readable storage medium having stored computer-executable instructions for performing the method of claim 11.

14. A computer-implemented method, comprising:

receiving a request for system information from a client; and isolating the client from each source of the system information, including:

a) determining that the request for system information corresponds to a plurality of sources of the system information;

b) communicating with each of the plurality of sources of the system information to determine whether a provider is capable of handling the request and to obtain data corresponding to the information requested, wherein determining whether the provider is capable of handling the request is based on a response to the communication;

c) if it is determined that a provider is incapable of handling the request, simplifying the request and sending the simplified request to the provider;

d) repeating step (c) until the provider provides the data;

e) aggregating the data into aggregated system information that satisfies the request wherein aggregating the data includes writing property values into a data structure; and f) providing the aggregated system information to the client in response to the request.

15. The method of claim 14 further comprising, filtering selected data received from at least one of the sources of system information.

16. The method of claim 14 further comprising, receiving extra information from a source of system information that is extra relative to the system information that the client has requested, and filtering the extra information such that the system information returned to the client corresponds to the request.

17. The method of claim 14, wherein at least one of the sources of the system information provides system information that is static, and at least one other of the sources provides system information that is dynamic.

18. The method of claim 14, wherein the request for system information comprises a complex query, and further comprising, reducing the complexity of the complex query into a simplified query.

19. The method of claim 18, wherein a superset of data is received from at least one source of system information in response to the simplified query, and further comprising, filtering the superset of data into a set of data that satisfies the complex query.

20. The method of claim 14, wherein at least two of the sources of system information provide conflicting data, and further comprising, resolving the conflicting data.

21. The method of claim 20, wherein the sources of system information are represented by hierarchically-arranged objects, and wherein resolving the conflicting data includes selecting data based on a hierarchy of the objects.

22. The method of claim 14, wherein the data from one source of system information includes information indicating that at least one data property should be obtained from another source of system information.

23. The method of claim 22, wherein the other source of system information is a dynamic provider.

24. The method of claim 22, wherein the other source of system information is a static provider.

25. The method of claim 14 wherein the sources of system information are represented by objects, and wherein an association object provides an association between at least two of the objects representing respective sources of system information.

26. A computer-readable storage medium having stored computer-executable instructions for performing the method of claim 14.

27. A computer-implemented method, comprising:

(a) receiving a query from a client;

(b) passing a request for information corresponding to the query as a current request to a provider of information;

(c) receiving a response from the provider, the response indicating whether the provider was capable of handling the current request for information;

(d) if the provider was not capable of handling the current request for information:

(i) storing information for use in future requests indicating a level of complexity that the provider is capable of handling;

(ii) simplifying the request for information from the provider into a new request, passing the new request to the provider as the current request, and returning to step (c); and (e) if the provider was capable of handling the current request for information, returning a result to the client corresponding to data provided by the provider.

28. The method of claim 27 wherein the data provided by the provider includes additional information with respect to the query, further comprising:

removing the additional information in the data; and returning a response to the client corresponding to the data with the additional information removed.

29. A computer-readable storage medium having stored computer-executable instructions for performing the method of claim 27.

* * * * *